Patented Apr. 20, 1943

2,317,257

UNITED STATES PATENT OFFICE 2,317,257

METHOD OF DYEING PHOTOGRAPHIC SILVER HALIDE EMULSIONS

John Dessauer, Irondequoit, N. Y., assignor to The Haloid Company, Rochster, N. Y., a corporation of New York No Drawing. Application October 2, 1941, Serial No. 413,337

2 Claims. (Cl. 95—7)

This invention relates to a method of dyeing photographic silver halide gelatin emulsions used for producing layers used in color photography, and it has for its object to afford a procedure for incorporating a dye in an emulsion in such a way that the dye is uniformly distributed through the emulsion and will remain permanently in such uniformly distributed relationship without tendency to bleed or penetrate adjacent layers.

One objection to the addition of dyestuffs to gelatin emulsions has been the tendency of the dyestuff to penetrate adjacent layers at various stages, either during the application of the layers one on the other or during processing of the material, after exposure, when the layers are soaked in solution, and there is a tendency for the dyestuff to travel from one layer to another, or into the solution, thus seriously deteriorating the adjacent layers and reducing the density of the dye.

The acidity or alkalinity of azo dyes has been harmful in reducing the photographic sensitivity of the emulsion, and it has been proposed to precipitate acid or basic dyestuffs in an emulsion with compounds of basic and acid reaction respectively, but with such practices it has not been possible to obtain a gelatin layer with dyestuff salts of reduced solubility and of sufficiently fine grain to be invisible to the naked eye and to respond properly to the usual bleachout process, or to produce a layer having a uniformly distributed dye or color throughout.

More particularly, the object of the invention is to afford a process for precipitating acid or basic dyestuffs with basic and acid compounds respectively to form dyestuff salts of microscopically fine grain that are invisible to the naked eye and are uniformly distributed throughout the emulsion, and to produce the salts in such way as to prevent any excessively large accumulations of the dyestuff salts in one spot or area in the layer that would prevent proper response to the bleachout treatment.

The invention resides primarily in controlling the size and distribution of the precipitated dyestuff salts in the emulsion by first mixing the alkaline and acid components separately in part of the emulsion constituting a colloidal medium, then mixing the two colloidal mediums or portions of emulsion to bring about formation of the dyestuff salts in the final mixture, and restricting the quantities of dyestuff and mordant that are added at any one time to the respective emulsion portions or colloidal mediums and making successive divisions of the emulsion into two portions in which small quantities of the dyestuff or mordant are mixed, such portions being mixed together and the operations repeated until the desired amount of dye is attained.

According to one successful method of practicing the invention, a given amount of silver halide gelatin emulsion for example 1000 cc. is divided into two portions which are preferably but not necessarily substantially equal in amount. To one of said portions of emulsion, a relatively small amount for example about 20 cc. of dyestuff is added and mixed, and to the other of said portions of emulsion a relatively small amount of the mordant or salt-forming material for example about 20 cc. is added and mixed. Thereupon, the two portions of the emulsion, with the dyestuff mixed in one and the mordant mixed in the other, are thoroughly mixed together, after which the mass of emulsion is again divided into two portions.

A relatively small amount of dyestuff for example about 20 cc. as mentioned above, is mixed in one portion of the mixture, and a relatively small amount of mordant for example about 20 cc. as mentioned above, is mixed in the other portion of the mixture, and the two portions are again thoroughly mixed together. This procedure is repeated as many times as required to obtain the desired amount of dye in the emulsion, there being preferably from three to six successive divisions and remixtures of the emulsion portions.

Any dyestuff that is suitable for the usual bleachout process can be used successfully such as the acid and alkaline azo dyes that are recognized in the art for this purpose, and to form the dyestuff salts, organic acids and organic bases are used, preferably of large molecular structure such as polymerization products of dicyandiamide and organic amino derivatives.

The dye and mordant are preferably added to the emulsion in small quantities at a time, the small unit of dye being first mixed in one colloidal medium while the mordant or salt-forming material in correspondingly small amount is first mixed in a separate colloidal medium, the two mediums or portions of emulsion being then brought together and thoroughly mixed, during which last mentioned operation, the precipitation of the dyestuff takes place.

Due to the small amounts of dye that are added at any one time, and since they are first mixed in a colloidal medium separately from the mordant, any large lump accumulations of the precipitated dye are effectively prevented, and in the final complete emulsion layer, the precipitated grains of dyestuff salt are microscopically small, uniformly and evenly distributed through the layer, and permanently retain this relationship without any tendency to penetrate adjacent layers.

While the invention has been described with reference to a specific procedure, it is not confined to the details described, and this application is intended to cover such departures as may come within the purposes of the invention and the scope of the following claims.

I claim:

1. The method of dyeing a photographic silver halide gelatin emulsion which consists in mixing a dyestuff in one portion of the emulsion, mixing a mordant in another portion of the emulsion, then mixing the said two portions of emulsion together, dividing said last mentioned mixture into two substantially equal portions, mixing a dyestuff in one of said divided portions and a mordant in the other of said divided portions of emulsion, mixing said divided portions of emulsion together, and repeating said steps until the desired quantity of dye has been added to the emulsion.

2. The method of dyeing a photographic silver halide gelatin emulsion which consists in mixing a relatively small amount of dyestuff in one portion of the emulsion, mixing a relatively small amount of mordant in another and substantially equal portion of the emulsion, then mixing said two portions of emulsion together, dividing said last mentioned mixture into two substantially equal portions, mixing a relatively small amount of dyestuff in one of said divided portions and a relatively small amount of mordant in the other of said divided portions of emulsion, mixing said divided portions of emulsion together, and repeating said steps until the desired quantity of dye has been added to the emulsion.

JOHN DESSAUER.